Figure 9:
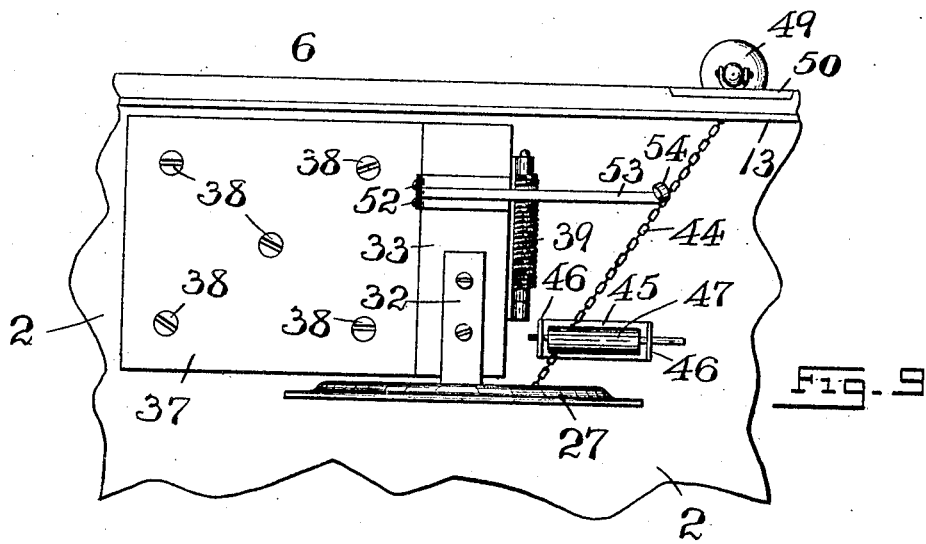

No. 881,918.                                             PATENTED MAR. 17, 1908.
E. L. GEISEL.
DRY CLOSET.
APPLICATION FILED OCT. 10, 1907.
5 SHEETS—SHEET 1.
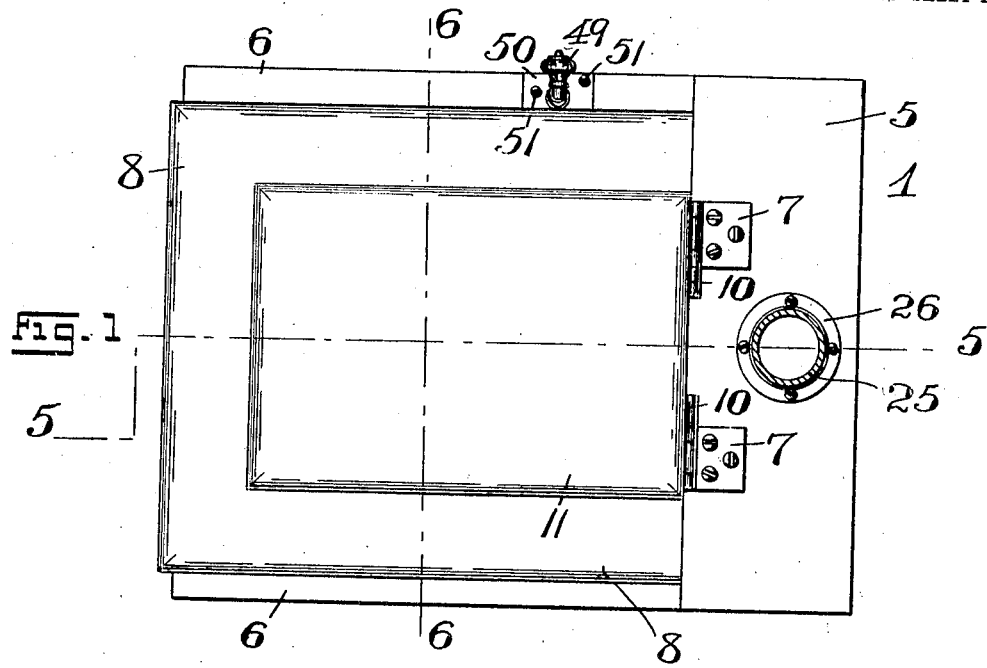
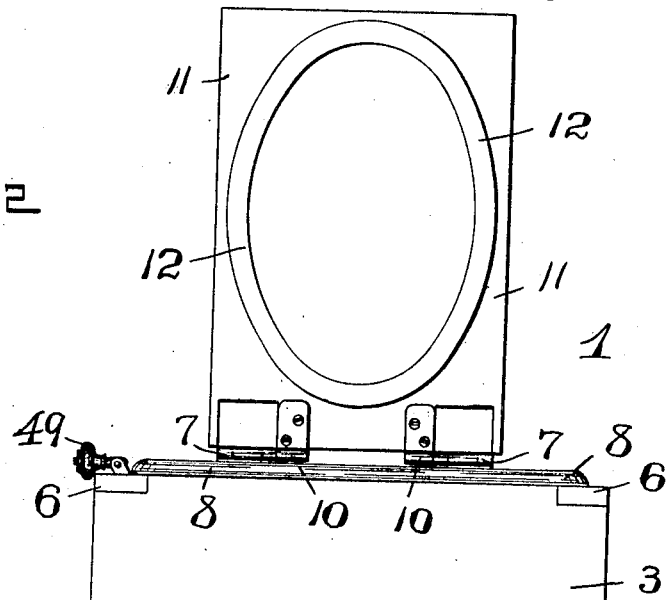
WITNESSES:                                  INVENTOR:
                                            Emil L. Geisel
                                            BY
                                            Fraentzel and Richards,
                                            ATTORNEYS.

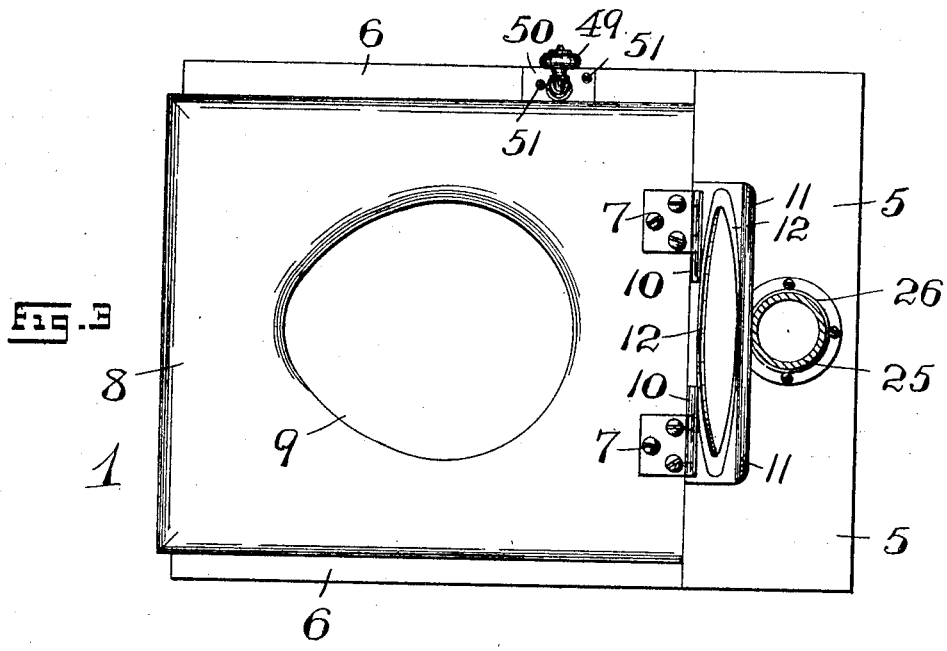
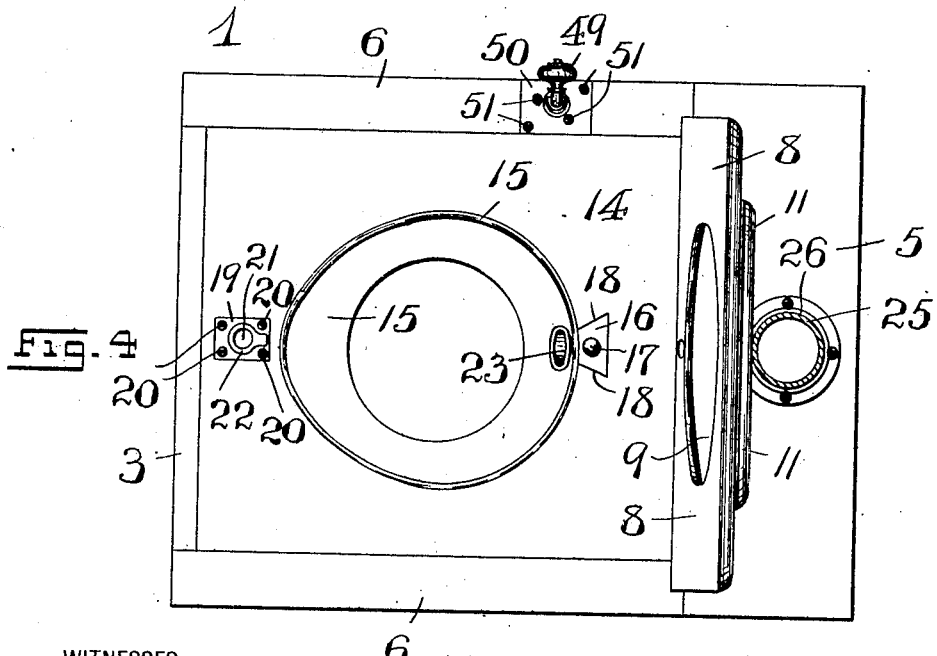

No. 881,918. PATENTED MAR. 17, 1908.
E. L. GEISEL.
DRY CLOSET.
APPLICATION FILED OCT. 10, 1907.
5 SHEETS—SHEET 3.
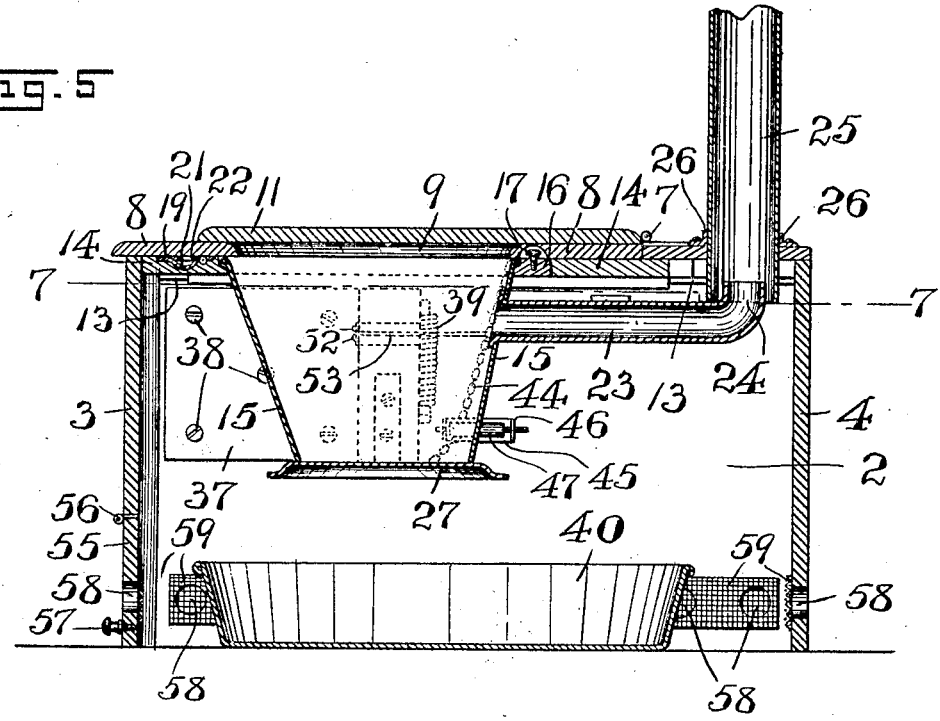
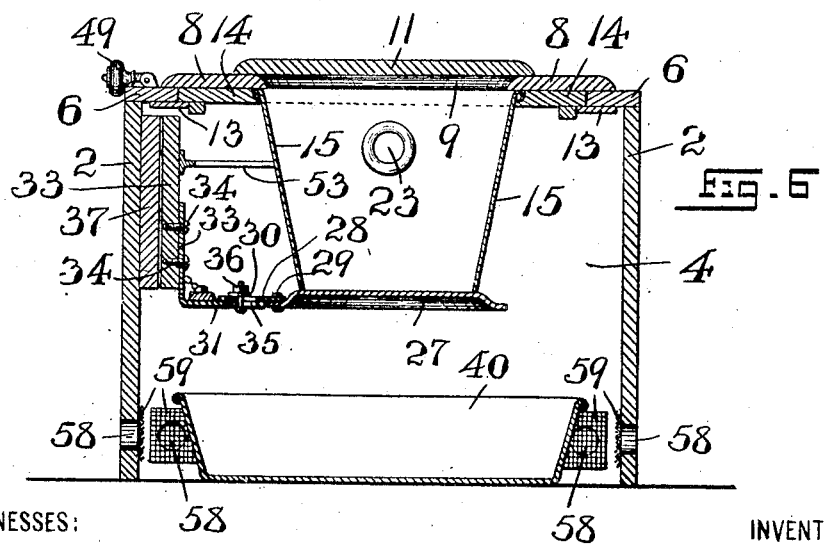
WITNESSES:
F. H. W. Fraentzel
Anna H. Abter
INVENTOR:
Emil L. Geisel,
BY
Fraentzel and Richards,
ATTORNEYS No. 881,918.
E. L. GEISEL.
DRY CLOSET.
APPLICATION FILED OCT. 10, 1907.
PATENTED MAR. 17, 1908.
5 SHEETS—SHEET 4.
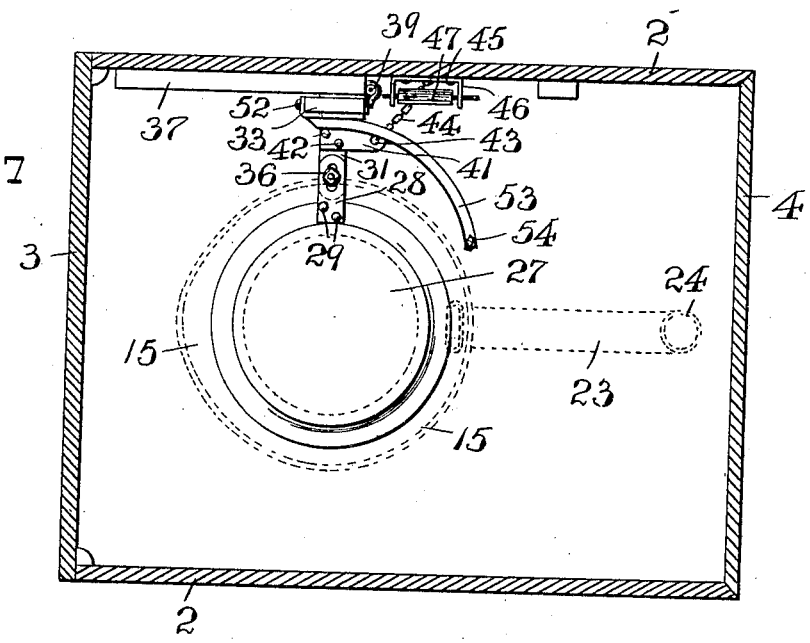
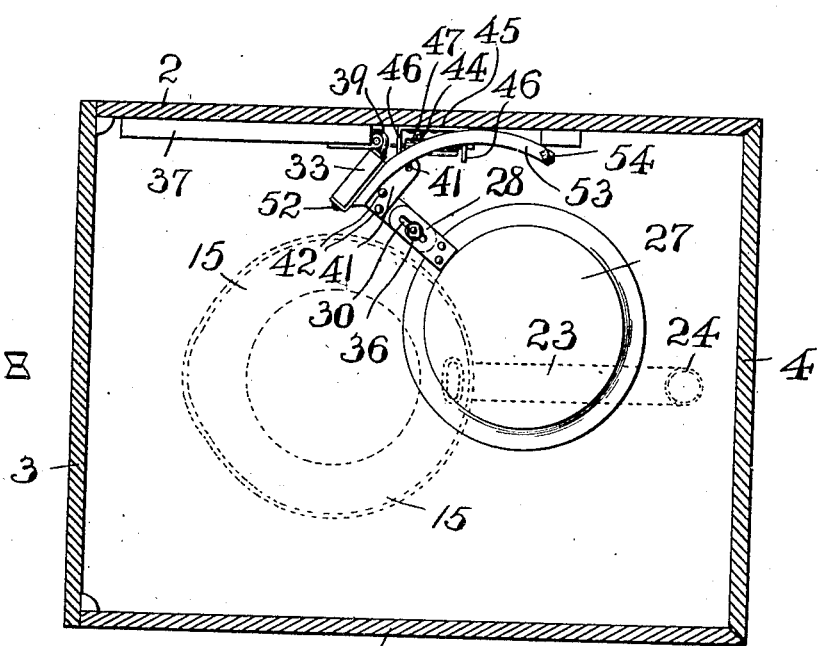
WITNESSES:
F. H. W. Fraentzel
Anna H. Arter
INVENTOR:
Emil L. Geisel.
BY
Fraentzel and Richards,
ATTORNEYS

UNITED STATES PATENT OFFICE.

EMIL L. GEISEL, OF MORGANVILLE, NEW JERSEY.

DRY CLOSET.

No. 881,918.   Specification of Letters Patent.   Patented March 17, 1908.

Application filed October 10, 1907. Serial No. 396,755.

*To all whom it may concern:*

Be it known that I, EMIL L. GEISEL, a citizen of the United States, residing at Morganville, in the county of Monmouth and State of New Jersey, have invented certain new and useful Improvements in Dry Closets, and do hereby declare the following to be a full, clear, and exact description of the invention, such as will enable others skilled in the art to which it appertains to make and use the same, reference being had to the accompanying drawings, and to characters of reference marked thereon which form a part of this specification.

The present invention has reference, generally, to improvements in waterless closets or privies, commonly known as dry-closets, and which are adapted for use in country districts in which there are no sewers or water supply systems; and, which, furthermore, are adapted to be used within a room of the house or out of doors in an out-house.

The present invention, therefore, has for its principal object to provide a novel, simply constructed, and perfectly sanitary stool which may be located either within doors or out of doors, and in which the use of water is unnecessary to its perfectly sanitary operation or use.

A further object of this invention is to provide a waterless closet or privy which is provided with a perfect system of ventilation by means of which the noxious gases or fumes which arise therein, when the same is in use, are carried away and do not penetrate into the room or other place wherein the said closet or privy is located. When the said closet or privy is located in a room, such as the bed room of a house, this ventilating means is adapted to be connected directly to the chimney of the house and thus provides a perfectly sanitary commode for indoor use.

Another object of this invention is to provide a receiving-funnel beneath the seat-hole of the said closet or privy, and means for automatically closing the said receiving-funnel against the upward passage therethrough of air-drafts, when in use, which is a very annoying and unhealthy objection to the ordinary country-privy; and, this said automatic closing means of the said receiving-funnel is further adapted to be operated to open the said receiving-funnel to permit the removal therefrom of any deposits made therein, but which is self-closing so that the same can not be allowed to remain open through carelessness or neglect.

A still further object of this invention is to provide a waterless-closet or privy, the receptacles of which may be easily and quickly removed and cleansed, and then replaced without any unusual inconvenience.

Other objects of this invention not at this time more particularly mentioned will be clearly understood from the following detailed description of the present invention.

With the various objects of the present invention in view, the said invention consists, primarily, in the novel waterless-closet or privy hereinafter set forth; and, furthermore, this invention consists in the various arrangements and combinations of devices and their parts, as well as in the details of the construction of the same, all of which will be more fully described in the following specification and then finally embodied in the clauses of the claims which are appended to and which form an essential part of this specification.

The invention is clearly illustrated in the accompanying drawings, in which:—

Figure 10:
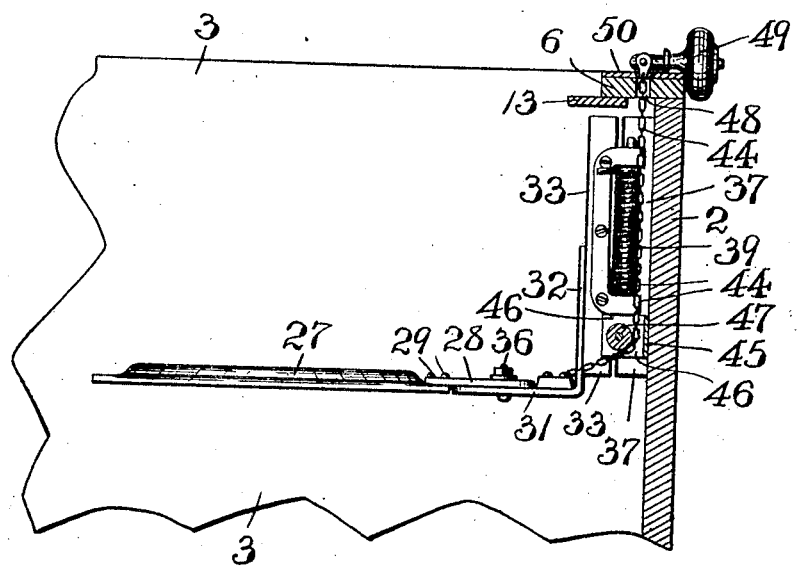

Figure 1 is a top or plan view of the waterless closet or privy in its closed relation which embodies the principles of the present invention. Fig. 2 is a front elevation of the same with the upper lid or cover raised. Fig. 3 is a plan or top view of the same with the upper lid or cover raised. Fig. 4 is a similar plan or top view of the same with the seat-hole lid or cover also raised. Fig. 5 is a central vertical longitudinal section of the same, taken on line 5—5 in the said Fig. 1. Fig. 6 is a central vertical cross-section of the same taken on line 6—6 in said Fig. 1. Figs. 7 and 8 are horizontal sections taken on line 7—7 in said Fig. 5, but in these said views the receiving-funnel is shown or indicated by dotted lines and the said views further illustrate the automatic bottom-closure of said receiving-funnel in its closed and open relation respectively. Figs. 9 and 10 are detail views of the said automatic bottom-closure of the said receiving-funnel looking toward the front and the side of the same respectively.

Similar characters of reference are employed in all of the above described views, to indicate corresponding parts.

Referring now to the several figures of the drawings, the reference-character 1 indicates the complete waterless-closet or privy embodying the principles of the present invention, the same comprising a suitable casing or cabinet formed by the side-walls 2 and the front and back walls 3 and 4 respectively. Arranged upon, and supported by the top edges of these side walls 2 and the back-wall 4 at the rear end of the casing or cabinet thus formed, is a top-member 5; and, extending from the top-member 5 along the top-edges of the side walls 2 to the front wall 3, are the side-members or edges 6. Pivotally secured by means of hinges 7 to the said top-member 5 is a seat-hole member 8 provided with the usual seat-hole or opening 9, this said seat-hole member 8 being supported by the side-members or ledges 6 and a portion of the top-edge of the front-wall 3. Pivotally connected with the said seat-hole member 8 by means of hinges 10 is a seat-hole cover 11. This said seat-hole cover is provided on its lower or under surface, where the same comes in contact with the said seat-hole member 8, with a ring or gasket 12 of rubber or any other suitable resilient material, adapted to surround the said seat-hole or opening 9 when the said seat-hole cover is closed and thus provide an air-tight closure for the said seat-hole or opening 9.

Secured upon the under-side of the said side-members or ledges 6, in any suitable manner, are strips or flange members 13 extending longitudinally along the edge of said side-members or ledges 6 and projecting beyond the edge of the same, so as to form a longitudinal flange or ledge. Removably supported upon the flange or ledge thus formed by the strips or flange-members 13 is a receiving-funnel holder 14 which is provided with a hole or opening in which may be inserted a receiving-funnel 15, which is preferably made of sheet-metal and tapers from its top toward its bottom edges. The top edges of said receiving-funnel 15 are supported by the edge of the hole or opening in the said receiving-funnel holder 14. To further secure the said receiving-funnel 15 in its relation with the receiving-funnel holder 14, the said receiving-funnel is provided with a dove-tail shaped block 16 provided with a knob or finger-piece 17, and which is secured to said receiving-funnel in any well-known manner. The said dove-tail-shaped block 16 is received in a like cut-away portion 18 in the said receiving funnel-holder 14, and is adapted to hold the said receiving-funnel 15 firmly in its operative relation with the said receiving funnel-holder 14. In order to lift out the receiving-funnel holder 14, and its receiving-funnel 15 supported therein, from its operative relation with the casing or cabinet for the purpose of cleaning and the like, there is provided near the front end of said receiving-funnel-holder 14, a countersunk plate 19 secured thereto by means of screws 20, or other suitable means. This said plate 19 is provided with a concave portion 21 and is further provided with a ring-member 22 pivotally secured to said plate 19 and adapted, when the same is not in use, to close down into said concave portion 21 of said plate so as to lie flush with the upper surface of said plate, in such a manner that it will not interfere with the tight closing of the seat-hole member 8 of the said casing or cabinet. The said receiving-funnel 15 is provided with a pipe or conduit 23 secured in its rear side and extending rearwardly. This said pipe or conduit 23 is provided at its free-end with an upwardly turned member or elbow 24, the open end of which extends into a pipe or conduit 25 of larger diameter, so as to leave an open space between the inner wall of said pipe or conduit 25 and the outer wall of said elbow 24. The said pipe or conduit 25 extends upwardly through a hole or opening in the top-member 5 which is adapted to receive the same, and said pipe or conduit 25 is secured in its relation to said top-member 5 by means of the flange-collar 26 secured thereon and to said pipe or conduit 25. The purpose of these pipes or conduits 23 and 25 is to afford a means of ventilating the interior of the casing or cabinet by conducting away therefrom the noxious gases or odors which may collect therein.

The pipe or conduit 25 may, when the waterless closet or privy is used indoors, be connected directly to the chimney of the house and the draft thereof will exhaust the gases and odors. The gases and odors collecting in the receiving funnel during its use, are conducted through the pipe or conduit 23 and thence into the pipe or conduit 25 to the chimney, and the gases or odors collecting in the bottom or interior of the casing or cabinet are drawn through the space between the inner walls of the pipe or conduit 25 and the outer walls of the elbow 24, which is located at the bottom of the pipe or conduit 25, and thence through said pipe or conduit 25 into the chimney; hence a perfectly sanitary and odorless privy is provided. The said receiving-funnel 15 is normally kept closed at its bottom portion by means of a movable disk 27, preferably of metal or similar material. The means for supporting this disk 27 consists of an arm 28 secured to said disk by means of rivets 29, or in any other suitable manner, this arm 28 being provided with a slot 30. The arm 28 is adapted to register with the free end-portion 31 of a bracket 32 which is secured to a block 33 by means of screws 34, or other suitable fastening means. The free end-portion 31 of said bracket 32 is further provided with a slot 35 which registers beneath the slot 30 of the arm 28, and a bolt and nut 36 is placed in said slots 30 and 35 for the purpose of rigidly securing the said arm 28 upon the free end portion 31 of the said bracket 32, and at the same time permit of an adjustment of the relation of said arms longitudinally in order that the said disk 27, may be made to register properly with the bottom of the said receiving-funnel when closing the same.

A block or supporting member 37 is secured by means of screws 38, or any other suitable means, to one of the side-walls 2 of the casing or cabinet. The block 33 upon which is secured the bracket 32 and the other mechanism supporting the said disk 27 is pivotally connected to this said block or supporting member 37 by means of a spring-hinge 39. This spring-hinge 39 maintains the block 33 in its folded position normally against the block 37 and consequently keeps the disk 27 in registration beneath the bottom of the receiving-funnel 15, as shown more particularly in Figs. 5, 6, 7, 9 and 10, of the drawings. The means for operating the disk 27, to remove the same from its normal position, as above described, in order to allow the deposits contained in the receiving-funnel 15 to be dropped in a receiving-pan or receptacle 40 which is placed in the bottom of the cabinet or casing to collect the said deposits therein, so that the same can be removed from time to time, comprises a lug or projection 41 secured to the free-end portion 31 of said bracket 32 by means of rivets 42 or the like. This said lug or projection 41 is provided in its free end with a hole or opening 43, and secured in this hole or opening 43 is one end of a chain 44, or other flexible connection. Said chain passes over a roller 47 which is journaled between a pair of lugs or projections 46 of a bracket 45 and then passes upwardly through an opening 48 in the side-member or ledge 6, the free-end thereof being secured to a knob or pull-handle 49. A plate 50 is provided with a hole or opening corresponding and registering with the hole or opening 48 in the side-member or ledge 6, is secured by means of screws 51, or the like, to the top of said side-member or ledge 6, and the knob or pull-handle 49 normally rests upon this said plate 50. Secured to the said block 33, by means of rivets, screws or the like 52, is an outwardly curved projecting member 53, which serves as a stop to limit the swinging movement of the disk 27, as will be clearly understood from an inspection of Fig. 8 of the drawings. This member 53 is also provided at its free end with a loop or ring-portion 54, at which the chain or flexible connection may be secured to this portion 54 if it is so desired.

The front-wall 3 is provided at its lower end with a door 55 pivotally secured to said front-wall 3 by means of the hinges 56. The said door 55 is provided with a knob 57 by means of which the said door may be opened whereby the pan or receptacle 40 may be removed from the interior of the casing or cabinet. In order to provide an intake for air, and thus aid in the proper operation of the ventilating devices, by creating a draft through the interior of the casing and through said ventilating devices, there are provided a plurality of holes or openings 58 in the side-walls 2, the back wall 4 and in the door 55 of the front wall 3. These openings are covered on their inner side by a mesh 59 of wire, or other suitable material, to prevent as far as possible the passage of dirt or foreign substances therethrough.

It will be readily understood that when using the waterless closet or privy, it is advisable to first place a piece of paper in the receiving funnel 15, so that it rests upon the exposed surface of the disk 27, then when the deposits are made in the said receiving-funnel 15, the chain 44 is pulled, which causes the disk 27 to be quickly slid from under the paper and deposits thereon, whereupon the same are caused to drop into a receiving-pan or receptacle 40; and, the disk 27 being returned to its normal position beneath the receiving-funnel 15, the parts are kept clean and sanitary.

It will be clearly evident from the above description, that the present invention provides a very simple and practical waterless-closet or privy which is perfectly sanitary, and which may be used with safety within the house without danger of causing disease or other unsanitary conditions.

I claim:—

1. In a waterless-privy, the combination, with a casing, of a seat-member pivotally secured thereto, an air-tight cover-member for said seat-member, a removable receiving-funnel holder means connected with said casing for supporting said removable receiving-funnel holder, a removable receiving funnel supported by said receiving-funnel holder, a pipe connected with said casing for carrying away the gases or odors collecting therein, a pipe connecting said receiving-funnel with the pipe in said casing, a receptacle in the bottom of said casing, beneath said receiving-funnel, a movable means for opening and closing the bottom of said receiving-funnel, and means for normally and automatically maintaining the closed relation of said receiving funnel, substantially as and for the purposes set forth.

2. In a waterless-privy, the combination, with a casing, of a seat-member pivotally secured thereto, an airtight cover-member for said seat-member, pivotally connected thereto, a removable receiving-funnel holder means connected with said casing for supporting said removable receiving-funnel holder, a receiving-funnel detachably secured to said receiving-funnel holder, a pipe connected with the said casing for carrying away the gases or odors collecting therein, a pipe connecting said receiving-funnel with the pipe in said casing, a receptacle in the bottom of said casing beneath said receiving-funnel, a movable disk adapted to normally close the bottom of said receiving-funnel, means for supporting said disk, and means for moving said disk to open and close the bottom of the said receiving funnel, substantially as and for the purposes set forth.

3. In a waterless-privy, the construction with side-walls, front and back walls, and, a top-member and side-ledges all forming a casing, of a seat-member pivotally secured to said top-member, a closure therefor pivotally connected with said seat-member, and means for causing an air-tight connection between said seat-member and said closure, strips secured beneath the edges of said side-ledges, adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closed position and automatically returning the same to said normal closing position, and means for ventilating said receiving-funnel and said casing, substantially as and for the purposes set forth.

4. In a waterless-privy, the combination, with side-walls, front and back walls, a top-member and side-ledges and, all forming a casing, of a seat-member pivotally secured to said top-member, a closure therefor, pivotally connected with said seat-member, and means for causing an air-tight connection between said seat-member and said closure, strips secured beneath the edges of said side-ledges adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closed position and automatically returning the same to said normal closing position, and means for ventilating said receiving-funnel and said casing, and a pan or receptacle in the bottom of said casing, beneath the said receiving-funnel, substantially as and for the purposes set forth.

5. In a waterless-privy, the combination, with side-walls, front and back-walls, and, a top-member and side-ledges all forming a casing, of a seat-member pivotally secured to said top-member, a closure therefor pivotally connected with said seat-member, and means for causing an air-tight connection between said seat-member and said closure therefor, strips secured beneath the edges of said side-ledges adapted to form longitudinal flanges projecting from said side-ledges, a receiving-funnel holder removably supported upon said flanges, a receiving funnel removably secured to said receiving-funnel holder, a disk normally closing the bottom of said receiving-funnel, means for removing said disk from said closed position and automatically returning the same to said normal closing position, and means for ventilating said receiving-funnel and said casing, a receptacle in the bottom of said casing, beneath the said receiving-funnel, and a door in said casing through which said receptacle may be removed from said casing.

6. In a waterless-privy, the combination, with side-walls, front and back walls, and a top-member and side-ledges, all forming a casing, of a seat-member pivotally connected with said top-member, a closure therefor pivotally connected with said seat-member, and means for causing an air-tight connection between said seat-member and said closure, strips secured beneath the edges of said side-ledges adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closing position and automatically returning the same to said normal closing position, comprising a supporting-member secured to a side-wall, a block, a spring-hinge connecting the said block with said supporting-member, a bracket secured upon said block, an adjustable arm connected with said bracket to which the said disk is secured, a projection provided with a hole, connected with said bracket, a chain connected by means of said hole to the projection, a bracket secured to a side-wall, a roller journaled in said bracket, said chain passing around said roller, and the free end of said chain passing to the exterior of the casing, and a pull-handle secured to the free-end of said chain, and means for ventilating said receiving funnel and said casing, substantially as and for the purposes set forth.

7. In a waterless-privy, the combination, with side-walls, front and back-walls, and a top-member and side-ledges, all forming a casing, of a seat-member pivotally connected with said top-member, a closure therefor pivotally connected with said seat-member, and means for causing an air-tight connection between said seat-member and said closure, strips secured beneath the edges of said side-ledges adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closing position and automatically returning the same to said normal closing position, comprising a supporting member secured to a side-wall, a block, a spring-hinge pivotally connecting the said block with said supporting-member, a bracket secured upon said block, an adjustable arm connected with said bracket to which the said disk is secured, a projection provided with a hole, connected with said bracket, a chain connected by means of said hole to the projection, a bracket secured to a side-wall, a roller journaled in said bracket, said chain passing around said roller, and the free end of said chain passing to the exterior of the casing, and a pull-handle secured to the free-end of said chain, means for ventilating said receiving funnel and said casing, and a receptacle in the bottom of said casing, beneath the said receiving-funnel, substantially as and for the purposes set forth.

8. In a waterless-privy, the combination, with side-walls, front and back walls, and a top-member and side-ledges, all forming a casing, of a seat-member pivotally connected with said top-member, a closure therefor pivotally connected with said seat-member, and means for causing an air-tight connection between said seat-member and said closure, strips secured beneath the edges of said side-ledges adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closing position and automatically returning the same to said normal closing position, comprising a supporting-member secured to a side-wall, a block, a spring-hinge pivotally connecting the said block with said supporting-member, a bracket secured upon said block, an adjustable arm connected with said bracket to which the said disk is secured, a projection provided with a hole, connected with said bracket, a chain connected by means of said hole to the projection, a bracket secured to a side-wall, a roller journaled in said bracket, said chain passing around said roller, and the free end of said chain passing to the exterior of the casing, and a pull-handle secured to the free-end of said chain, and means for ventilating said receiving funnel and said casing, a receptacle in the bottom of said casing, beneath the said receiving-funnel, and a door in said casing through which said receptacle may be removed from said casing, substantially as and for the purposes set forth.

9. In a waterless-privy, the combination, with side-walls, front and back walls, and a top-member and side-ledges, all forming a casing, of a seat-member pivotally connected with said top-member, a closure therefor pivotally connected with said seat-member, and means for causing an air-tight connection between said seat-member and said closure, strips secured beneath the edges of said side-ledges adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closing position and automatically returning the same to said normal closing position, comprising a supporting-member secured to a side-wall, a block, a spring-hinge pivotally connecting the said block with said supporting-member, a bracket secured upon said block, an adjustable arm connected with said bracket to which the said disk is secured, a projection provided with a hole, connected with said bracket, a chain connected by means of said hole to the projection, a bracket secured to a side-wall, a roller journaled in said bracket, said chain passing around said roller, and the free end of said chain passing to the exterior of the casing, and a pull-andle secured to the free-end of said chain, and means for ventilating said receiving funnel and said casing, comprising, a large pipe extending into the interior of said casing, said pipe being secured to the top-member by means of a collar, a smaller pipe connected with said receiving-funnel and extending rearwardly, the free end of said smaller pipe extending into the open end of said first mentioned pipe which extends into said casing, so as to provide a space between the inner surface of said large pipe and the outer surface of said smaller pipe, through which the gases or odors in the casing may pass, substantially as and for the purposes set forth.

10. In a waterless-privy, the combination, with side-walls, front and back walls, and a top-member and side-ledges, all forming a casing, of a seat-member pivotally connected with said top-member, a closure therefor pivotally connected with said seat-member, and means for causing an air-tight connection between said seat-member and said closure, strips secured beneath the edges of said side-ledges adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closing position and automatically returning the same to said normal closing position, comprising a supporting-member secured to a side-wall, a block, a spring-hinge pivotally connecting the said blocks with said supporting-member, a bracket secured upon said block, an adjustable arm connected with said bracket to which the said disk is secured, a projection provided with a hole, connected with said bracket, a chain connected by means of said hole to the projection, a bracket secured to a side-wall, a roller journaled in said bracket, said chain passing around said roller, the free end of said chain passing to the exterior of the casing, and a pull-handle secured to the free-end of said chain, and means for ventilating said receiving funnel and said casing, comprising, a large pipe extending into the interior of said casing, said pipe being secured to the top-member by means of a collar, a smaller pipe of smaller diameter connected with said receiving-funnel and extending rearwardly, the free end of said smaller pipe extending into the open end of said first mentioned pipe which extends into said casing, so as to provide a space between the inner surface of said large pipe and the outer surface of said smaller pipe, through which the gases or odors in the casing may pass, surrounding walls of the casing provided with openings to form air inlets and a mesh, covering said openings, substantially as and for the purposes set forth.

11. In a waterless-privy, the combination, with side-walls, front and back walls, and a top-member and side-ledges, all forming a casing of a seat - member pivotally connected with said top-member, a closure therefor pivotally connected with said seat-member, and means for causing an air-tight connection between said seat-member and said closure, therefor, strips secured beneath the edges of said side-ledges adapted to form longitudinal flanges projecting from said side-ledges, a receiving-funnel holder removably supported upon said flanges, a receiving-funnel removably secured to said receiving - funnel holder, a disk normally closing the bottom of said receiving-funnel, means for removing said disk from said closing position and automatically returning the same to said normal closing position, comprising a supporting-member secured to a side-wall, a block, a spring-hinge pivotally connecting the said block with said supporting-member, a bracket secured upon said block, an adjustable arm connected with said bracket to which the said disk is secured, a projection provided with a hole, connected with said bracket, a chain connected by means of said hole to the projection, a bracket, secured to a side-wall, a roller journaled in said bracket, said chain passing around said roller, and the free end of said chain passing to the exterior of the casing, and a pull-handle secured to the free-end of said chain, and means for ventilating said receiving funnel and said casing, comprising, a large pipe extending into the interior of said casing, said pipe being secured to the top-member by means of a collar, a smaller pipe connected with said receiving-funnel and extending rearwardly, the free end of said smaller pipe extending into the open end of said first mentioned pipe which extends into said casing or cabinet so as to provide a space between the inner surface of said large pipe and the outer surfaces of said smaller pipe, through which the gases or odors in the casing may pass, the surrounding walls of the casing, being provided with openings, to form air inlets and a screen covering said openings, a receptacle in the bottom of said casing, beneath the said receiving-funnel, substantially as and for the purposes set forth.

12. In a waterless-privy, the combination, with side-walls, front and back walls, and a top-member and side-ledges, all forming a casing, of a seat - member pivotally connected with said top-member, a closure therefor pivotally connected with said seat-member, and means for causing an air-tight connection between said seat-member and said closure, strips secured beneath the edges of said side - ledges adapted to form longitudinal flanges projecting from said side-ledges, a receiving-funnel holder removably supported upon said flanges, a receiving-funnel removably secured to said receiving-funnel holder, a disk normally closing the bottom of said receiving-funnel, means for removing said disk from said closing position and automatically returning the same to said normal closing position, comprising a supporting-member secured to a side-wall, a block, a spring-hinge pivotally connecting the said blocks with said supporting-member, a bracket secured upon said block, an adjustable arm connected with said bracket to which the said disk is secured, a projection provided with a hole, connected with said bracket, a chain connected by means of said hole to the projection, a bracket, secured to a side-wall, a roller journaled in said bracket said chain passing around said roller, and the free end of said chain passing to the exterior of the casing, and a pull-handle secured to the free-end of said chain, and means for ventilating said receiving funnel and said casing, comprising, a large pipe extending into the interior of said casing, said pipe being secured to the top-member by means of a collar, a smaller pipe connected with said receiving - funnel and extending rearwardly, the free end of said smaller pipe extending into the open end of said first mentioned pipe which extends into said casing, so as to provide a space between the inner surface of said large pipe and the outer surfaces of said smaller pipe, through which the gases or odors in the casing may pass, the surrounding walls of the casing being provided with openings, to form air inlets, and a screen covering said openings, a receptacle in the bottom of said casing, beneath the said receiving-funnel, and a door in said casing through which said receptacle may be removed from said casing.

In testimony, that I claim the invention set forth above I have hecunto set my hand this 8th day of October, 1907.

EMIL L. GEISEL.

Witnesses:
FREDK. C. FRAENTZEL,
ANNA H. ALTER.